Patented July 18, 1939

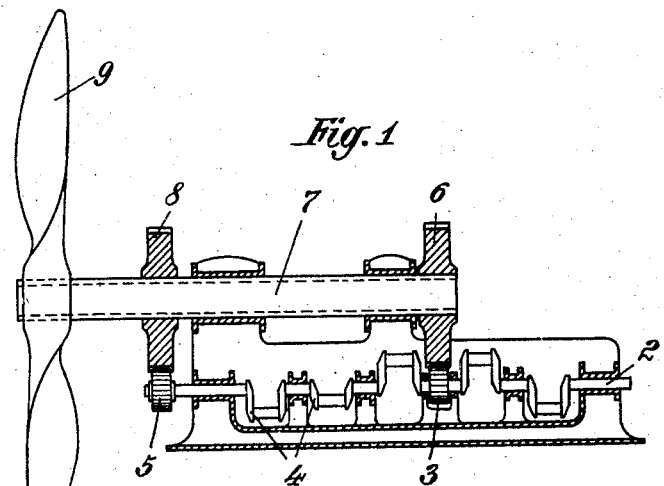
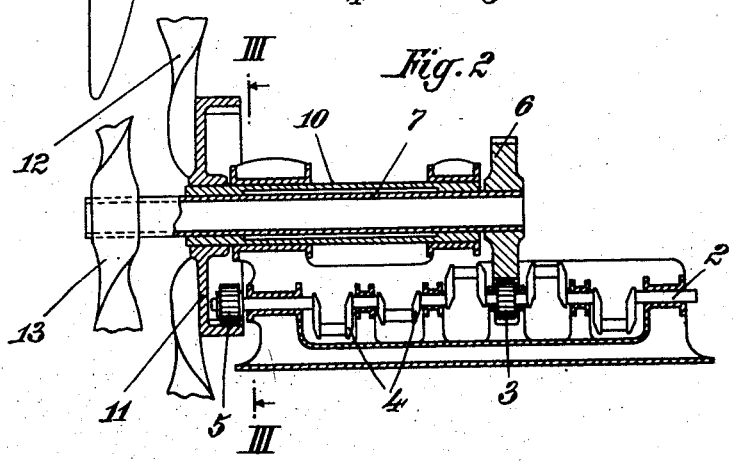
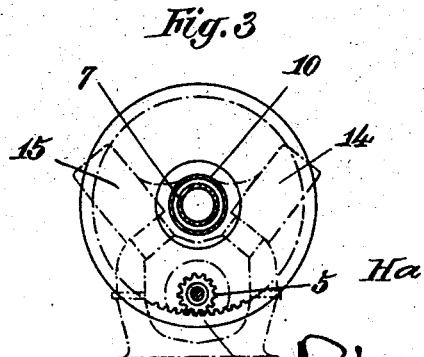

2,166,896

UNITED STATES PATENT OFFICE 2,166,896

CRANKSHAFT ARRANGEMENT FOR INTERNAL COMBUSTION ENGINES

Hans Gregers Nissen, Berlin-Steglitz, Germany

Application May 27, 1938, Serial No. 210,496
In Great Britain April 30, 1938

2 Claims. (Cl. 74—389)

The present invention relates to an arrangement for deriving the drive from a multi-throw crank shaft of internal combustion engines with the cylinders arranged in series and has for its object to provide a construction which, in comparison with the constructions hitherto known, has a higher natural frequency and a greater rigidity of the crank shaft, as well as smaller torsional distortion between the individual cranked portions of the crank shaft in the range of the critical speeds.

In internal combustion engines with the cylinders arranged in series it frequently occurs that with the provision of more than four cylinders the natural frequency is so low that the critical speeds lie beneath the working speed. Thus in practice any means whereby a higher natural frequency is obtained is valuable.

In the construction forming the basis of the present application, instead of deriving the entire power from all cylinders at one or both ends of the crank shaft, the power is derived not only at one end of the crank shaft as hitherto but also at a second point located between two cranked portions of the crank shaft, i. e. within the series of cylinders. For example the second point at which the power is derived may lie between the third and fourth cylinders of a five cylinder arrangement, between the fourth and fifth or fifth and sixth cylinders in a seven cylinder arrangement, and between the fifth and sixth cylinders in an engine having eight cylinders in series. Such constructions afford not only higher natural frequencies and thus higher critical speeds but also give much smaller torsional distortion between two cranked portions of the shaft within the range of any critical speeds which may occur. The oscillatory forces which occur in the range of critical speeds and which tend to destroy the crank shaft thus assume much smaller dimensions. Thus it is possible with the new arrangement for the critical speeds which hitherto were lower than the working speed to be raised to above the working speed so that they no longer endanger the crank shaft.

Such an arrangement is shown semi-diagrammatically by way of example in Fig. 1 of the accompanying drawing for a five-throw crank shaft. Here the counter-shaft 7 which carries the propeller 9 is driven from the crank shaft 2 by two sets of gear wheels 3, 6 and 5, 8. The gear wheel 3 is carried on the crank shaft 2 between the third and fourth cylinders. The bearing for the crank shaft 2 between these two cylinders is made in two parts and the spacing of these two parts as well as the length of the corresponding bearing portion of the crank shaft is sufficient to enable the gear wheel 3 to be accommodated on the crank shaft 2 between the two parts of the bearing.

It is however immaterial whether the power derived at the two points 3 and 5 is applied to the same counter-shaft or to different counter-shafts. It is possible, for example, particularly with aircraft motors to operate with two shafts which for example can be arranged one within the other. Such an arrangement is shown in Fig. 2 of the accompanying drawing, which otherwise corresponds with Figure 1. Here the shaft 7 which carries the propeller 13 is arranged within the hollow shaft 10 which carries the propeller 11. By means of the gear wheels 3 and 6 the shaft 7 is rotated in one direction and by means of the internally toothed wheel 11 and the gear wheel 5 the shaft 10 is rotated in the opposite direction. In Figure 2 the crank shaft is subdivided by the gear wheel 3 in the same way as in Figure 1 and consequently the critical speed is increased in both cases.

Figure 3, which in respect of the arrangement of the shafts 7 and 10 and the wheels 5 and 11 corresponds to a section along the line III—III of Figure 2, shows an arrangement in which the cylinders 14, 15 are in V-formation. It is then preferable to arrange the shafts 7 and 10 in the angular space between the cylinders 14 and 15.

The invention is not limited to the specific disclosure, such terms as "gear wheel", "gearing" or "bearing" being construed in their broad senses in the following claims.

I claim:

1. In an internal combustion engine, a multi-throw crank shaft, a plurality of bearings for said crankshaft, a gear wheel mounted at one end thereof, a divided bearing between two adjacent throws of said crankshaft, a gear wheel mounted on said crank shaft between the two parts of said divided bearing, a countershaft mounted parallel to the axis of rotation of said crank shaft, and gear wheels mounted on said countershaft in constant mesh with the gear wheels on the crankshaft for simultaneous engagement with said gear wheels mounted on the crank shaft, whereby to provide a relatively high natural vibrational frequency of said crankshaft.

2. In an internal combustion engine, a multi-throw crankshaft, a plurality of bearings for said crankshaft, a gear wheel mounted on said crankshaft at one end thereof, a divided bearing between two adjacent throws of said crankshaft, a second gear wheel mounted on the crankshaft between the two parts of said divided bearing, and power transmission means driven by said gear wheels whereby to provide a relatively high natural vibrational frequency of said crankshaft, said power transmission means including a propeller shaft, a third gear wheel mounted on said propeller shaft and in constant mesh with the first-mentioned gear wheel on said crankshaft, and a second propeller shaft having a fourth gear wheel mounted thereon, said fourth gear wheel being in constant mesh with the second gear wheel on said crankshaft.

HANS GREGERS NISSEN.